(12) United States Patent
Kroth

(10) Patent No.: US 12,262,652 B2
(45) Date of Patent: Apr. 1, 2025

(54) GAUGE WHEEL SCRAPER FOR OPENER DISC

(71) Applicant: DEERE & COMPANY, Moline, IL (US)

(72) Inventor: Rogerio L. Kroth, Horizontina (BR)

(73) Assignee: DEERE & COMPANY, Moline, IL (US)

( * ) Notice: Subject to any disclaimer, the term of this patent is extended or adjusted under 35 U.S.C. 154(b) by 753 days.

(21) Appl. No.: 17/403,059

(22) Filed: Aug. 16, 2021

(65) Prior Publication Data

US 2023/0052891 A1  Feb. 16, 2023

(51) Int. Cl.
| | | |
|---|---|---|
| A01B 23/06 | (2006.01) | |
| A01B 15/16 | (2006.01) | |
| A01C 5/06 | (2006.01) | |
| B60S 1/68 | (2006.01) | |

(52) U.S. Cl.
CPC .............. *A01B 23/06* (2013.01); *A01C 5/064* (2013.01); *B60S 1/685* (2013.01); *A01B 15/16* (2013.01)

(58) Field of Classification Search
CPC ......... A01B 23/06; A01B 15/16; A01C 5/064; B60S 1/685
See application file for complete search history.

(56) References Cited

U.S. PATENT DOCUMENTS

| | | | |
|---|---|---|---|
| 4,408,551 A | 10/1983 | Keller et al. | |
| 5,970,891 A * | 10/1999 | Schlagel | A01C 5/066 172/555 |
| 8,720,351 B1 * | 5/2014 | Wipf | A01C 7/203 172/578 |
| 10,251,335 B2 * | 4/2019 | Phely | B60B 7/04 |
| 11,266,063 B2 * | 3/2022 | Schaffert | A01B 23/06 |
| 2010/0251947 A1 * | 10/2010 | Mariman | B60C 7/26 152/379.3 |
| 2014/0014377 A1 * | 1/2014 | Hesla | A01C 5/068 172/558 |
| 2015/0289433 A1 * | 10/2015 | Sanderson | A01B 23/06 172/604 |
| 2016/0088789 A1 * | 3/2016 | Anderson | A01C 7/203 111/135 |
| 2016/0114623 A1 * | 4/2016 | Smith | B60B 3/147 29/894.31 |
| 2016/0128266 A1 * | 5/2016 | Phely | B60B 11/02 172/604 |

(Continued)

FOREIGN PATENT DOCUMENTS

EP  3017967 A1  5/2016

OTHER PUBLICATIONS

Extended European Search Report and Written Opinion issued in European Patent Application No. 22182656.3, dated Dec. 22, 2022, in 07 pages.

*Primary Examiner* — Thomas B Will
*Assistant Examiner* — Julia C Tran
(74) *Attorney, Agent, or Firm* — Taft Stettinius & Hollister LLP; Stephen F. Rost

(57) ABSTRACT

A scraper system for an agricultural machine includes a frame, an opener disc coupled to the frame, a gauge wheel positioned adjacent the opener disc and configured to rotate relative to the frame, and a scraper configured to rotate with the gauge wheel to remove soil or debris from the opener disc. The scraper is ring-shaped, directly coupled to the gauge wheel, and spaced apart from the frame.

19 Claims, 7 Drawing Sheets

(56) References Cited

U.S. PATENT DOCUMENTS

| | | | |
|---|---|---|---|
| 2017/0208734 A1 | 7/2017 | Weisz et al. | |
| 2019/0230842 A1* | 8/2019 | Martin | A01C 7/203 |
| 2019/0269060 A1* | 9/2019 | Nance | A01B 21/086 |
| 2020/0337216 A1* | 10/2020 | Hodel | A01C 5/06 |
| 2021/0037697 A1* | 2/2021 | Hornung | A01C 7/203 |
| 2021/0168992 A1* | 6/2021 | Phély | A01C 5/06 |
| 2022/0371555 A1* | 11/2022 | Schaffert | A01C 5/068 |
| 2023/0112791 A1* | 4/2023 | Jung | A01C 5/068 |
| | | | 111/52 |
| 2023/0389463 A1* | 12/2023 | Armoa | A01C 7/203 |

\* cited by examiner

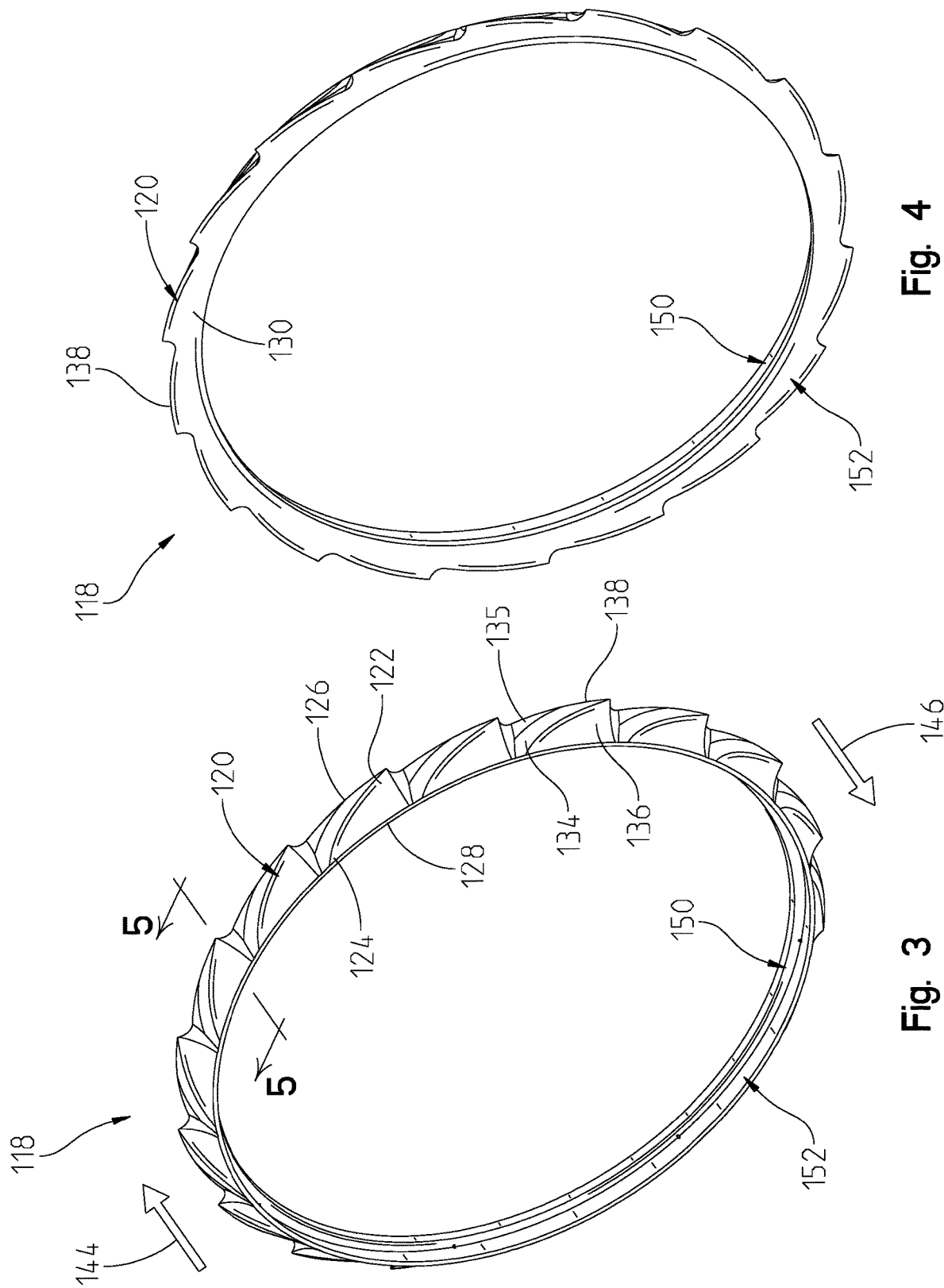

GAUGE WHEEL SCRAPER FOR OPENER DISC

FIELD OF THE DISCLOSURE

The present disclosure relates to an agricultural machine having a row unit or fertilizer unit, and more particularly, to a scraper for an opener disc of the row unit or fertilizer unit.

BACKGROUND OF THE DISCLOSURE

Work machines, such as those in the agricultural, construction, and forestry industries perform a variety of operations. In some instances, work machines include a fertilizer unit for distributing fertilizer and/or a row unit for planting seed. Fertilizer units and row units include one or more opener discs for creating a furrow as the work machine moves along the soil. The fertilizer and/or seed may be placed in the soil before the furrow is closed by a closing disc on the fertilizer unit or row unit.

Conventional row units and/or fertilizer units may include a device for scraping or otherwise removing soil and other debris from the opener disc as the work machine moves along the soil. Especially for row units, the conventional scrapers may be positioned on an internal side and an external side of the opener discs. The conventional scraper disc on the external side of the opener disc may be coupled directly to the frame of the row unit. In some operations, especially in red and/or moist soils, the conventional scraper disc directs the soil and debris inside the gauge wheel that is adjacent the external side of the opener disc, which causes a plug to form inside the gauge wheel, which reduces the effectiveness of the gauge wheel and the conventional scraper.

Therefore, what is needed is a scraper arranged relative to the gauge wheel, such that the soil and debris removed from the opener disc is deposited away from the inside of the gauge wheel. What is also needed is a cost effective scraper. Such a scraper may be located away from the frame of the row unit or fertilizer unit as described in detail here. It may also be advantageous for the position of the scraper to be adjustable relative to the opener disc such that an operator may easily adjust the clearance therebetween.

SUMMARY

In an illustrative embodiment a scraper system for an agricultural machine comprises: a frame; an opener disc coupled to the frame; a gauge wheel positioned adjacent the opener disc and configured to rotate relative to the frame; and a scraper configured to rotate with the gauge wheel to remove soil or debris from the opener disc; wherein the scraper is spaced apart from the frame.

In some embodiments, the scraper is ring-shaped. In some embodiments, the scraper includes a plurality of teeth extending radially outwardly away from a center of the gauge wheel; and each tooth of the plurality of teeth is arranged to contact the opener disc during forward travel of the agricultural machine.

In some embodiments, each tooth of the plurality of teeth is sloped in a circumferential direction such that: (i) each tooth includes a first end and a second end that is located a distance counterclockwise from the first end, and (ii) the second end of each tooth is located radially inward of the first end of each tooth.

In some embodiments, the gauge wheel is configured to rotate counterclockwise as the agricultural machine moves in a forward direction.

In some embodiments the scraper includes a laterally inwardly facing surface, which is substantially planar and configured to contact the opener disc during forward travel of the agricultural machine.

In some embodiments, the scraper includes one or more radially outwardly facing surfaces; and the one or more radially outwardly facing surfaces intersect the laterally inwardly facing surface of the scraper to define teeth of the scraper.

In some embodiments, the gauge wheel and the scraper are separate components coupled together. In some embodiments, the scraper is coupled directly to the gauge wheel. In some embodiments, the scraper is coupled directly to the gauge wheel via a press-fit connection.

In some embodiments, the scraper includes a gauge-wheel-contacting portion comprising one or more surfaces configured to abut the gauge wheel; the scraper further includes one or more tabs positioned on the one or more surfaces configured to abut the gauge wheel; and the one or more tabs prevent rotation of the scraper relative to the gauge wheel during operation of the agricultural machine.

In some embodiments, the gauge wheel includes a compressible portion that is compressed against a radially inwardly facing surface included in the gauge-wheel-contacting portion of the scraper. In some embodiments, gauge wheel further comprises a rim positioned radially inward of the compressible portion; and the compressible portion of the gauge wheel is compressed between the rim and the scraper.

In some embodiments, the gauge wheel and the scraper are a single monolithic component.

In another illustrative embodiment, a scraper for removing soil or debris from an opener disc of an agricultural machine comprises: a ring-shaped body including a plurality of teeth defined along a circumference thereof; the ring-shaped body further includes a hoop and a lip that is defined on a radially inward side of the hoop, wherein the hoop and the lip cooperate to form the plurality of teeth; the hoop includes a radially outward side and a radially inwardly facing surface that faces opposite the radially outward side; the lip includes: (i) a first surface extending radially outwardly to the radially outwardly facing side of the hoop to define tips of the plurality of teeth, and (ii) a second surface that faces opposite the first surface; and the radially inwardly facing surface of the hoop cooperates with the second surface of the lip to define a cavity in the ring-shaped body.

In some embodiments, the radially outward side of the hoop includes a concave surface. In some embodiments, the first surface of the lip is substantially planar. In some embodiments, each tooth of the plurality of teeth is sloped in a circumferential direction and sloped in a lateral direction. In some embodiments, the scraper further comprises one or tabs coupled to at least one of the radially inwardly facing surface of the hoop and the second surface of the lip in the cavity of the ring-shaped body.

In another illustrative embodiment, a method of assembling a scraper system for an agricultural machine comprises: coupling a ring-shaped scraper to a gauge wheel of the agricultural machine in an arrangement such that an internally facing side of the ring-shaped scraper contacts an externally facing side of an opening disc of the agricultural machine.

In some embodiments, the method further comprises: removing a conventional scraper from the agricultural machine, and the conventional scraper and ring-shaped scraper are each configured to remove soil or debris from the external side of the opening disc of the agricultural machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 1 shows a ring-shaped scraper coupled to a gauge wheel and in contact an opener disc of the row unit;

FIG. 3 is a front perspective view of the scraper;

FIG. 4 is a rear perspective view of the scraper;

FIG. 8 shows a ring-shaped scraper coupled to a gauge wheel and in contact with an opener disc of the fertilizer unit.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
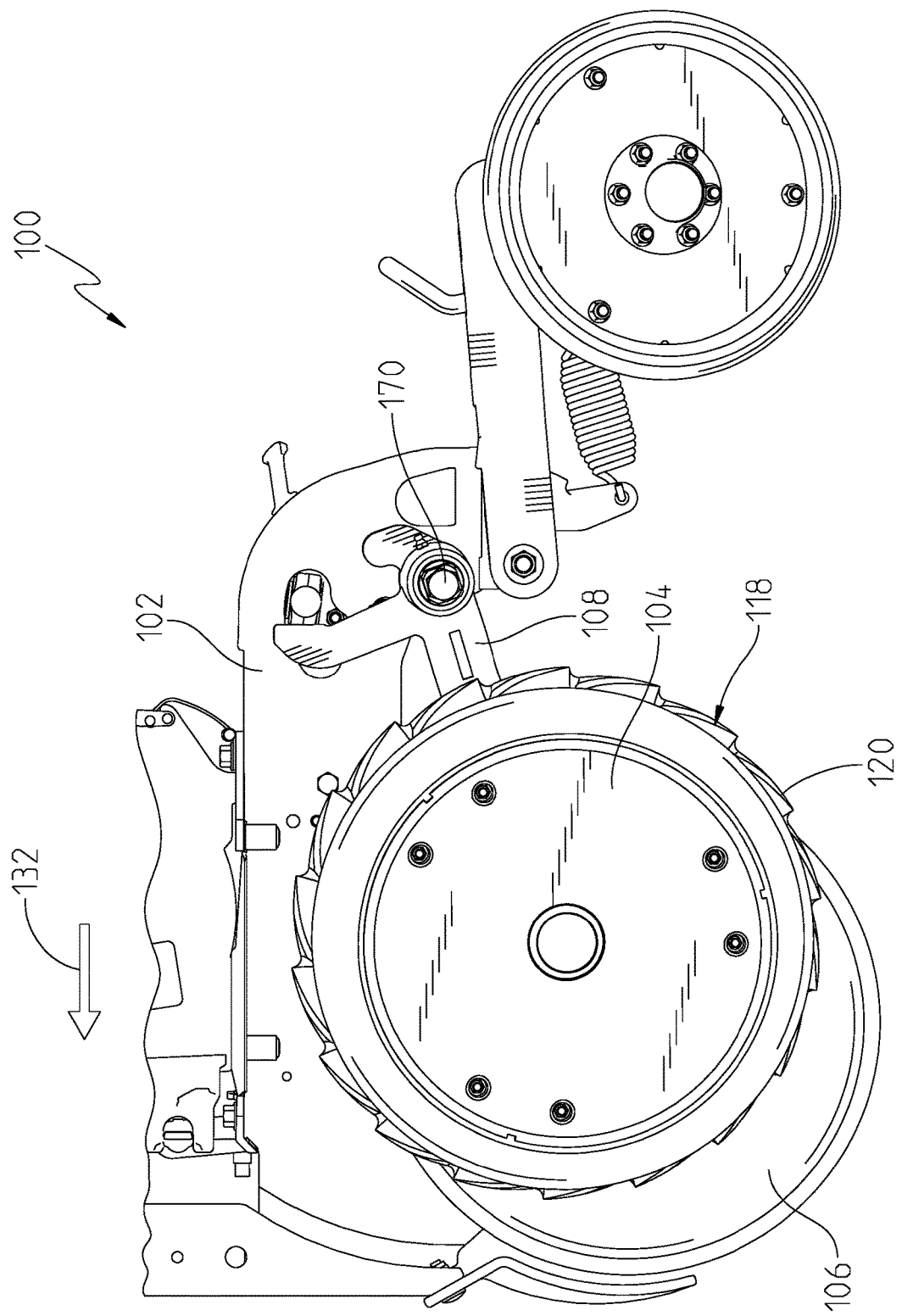
FIG. 1 is a side view of a row unit of an agricultural machine such as a row crop planter.

FIG. 1 is an exemplary embodiment of a row unit 100 for use with an agricultural machine such as a row crop planter. Such an agricultural machine may include a main frame supported above the ground by ground engaging mechanisms such as tracks or wheels. The main frame may support one or more commodity containers, which store seed or fertilizer. In some examples, the main frame may be coupled to an adjustable frame movable relative to the main frame. Depending on the structure of the agricultural machine, the row unit 100 may be coupled to the adjustable frame or directly to the main frame.

It should be appreciated that the disclosure herein is directed to the structure and arrange of a scraper for use with a row unit or fertilizer unit of an agricultural machine, and as such, the disclosure herein is not limited to any particular agricultural machine but instead applies to any agricultural machine capable of including one or more row units or fertilizer units.

Referring now to FIG. 1, the row unit 100 includes a frame 102, a pair of opener discs, a pair of closing discs, a pair of gauge wheels, and a pair of scrapers each coupled directly to the gauge wheels, respectively. With reference to the paired components, it should be appreciated that only one side of the machine is visible in FIG. 1, but the paired components are each mirror images of one another and as such any description of one such component applies equally to the other.

Figure 2:
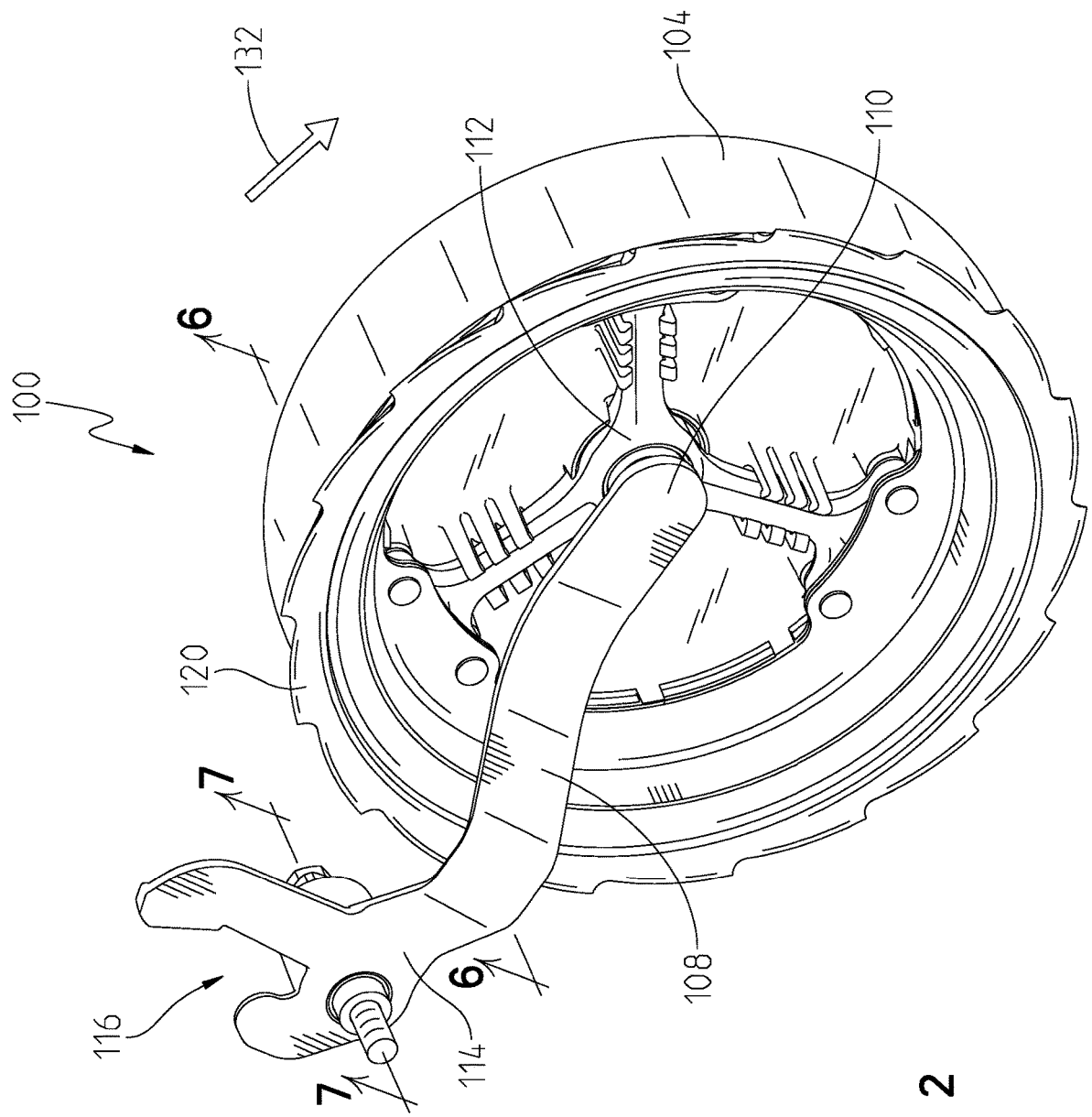
FIG. 2 is a rear perspective view of the scraper, the gauge wheel, and an adjustment mechanism that couples the gauge wheel to the frame of the row unit.

As shown in FIG. 1, a gauge wheel 104 is positioned adjacent the external side of the opener disc 106. The gauge wheel 104 is coupled indirectly to the frame 102 via an arm 108, which allows the gauge wheel 104 to travel freely in the vertical direction to determine the depth of the furrow created by the opener disc 106 as it cuts through the soil. In particular, as shown in FIG. 2, the arm 108 includes a first end 110 coupled to the coupled to a hub 112 of the gauge wheel 104 and a second end 114 coupled to the frame 102 of the row unit 100. The second end 114 comprises an adjustment mechanism 116, which is configured to change the lateral distance between the gauge wheel 104 and the opener disc 106, as will be described in more detail below.

As suggested by FIG. 1, the gauge wheel 104 is configured to rotate relative to the frame 102 of the row unit 100. The row unit 100 further includes a scraper 118 coupled directly to the gauge wheel 104. In the illustrative embodiment, the scraper 118 is ring-shaped and includes a plurality of teeth 120 configured to remove soil and debris from the external side of the opener disc 106. Each tooth 120 is arranged to contact the opener disc 106 during forward travel of the row unit 100. Specifically, as the gauge wheel 104 rotates relative to the frame 102, the scraper 118 rotates with the gauge wheel 104 abutting the opener disc 106 and thereby removing dirt and debris from the opener disc 106. The gauge wheel 104 is configured to rotate counterclockwise as the row unit 100 moves in a forward direction shown by the arrow 132. The teeth 120 are configured to contact the ground providing better traction for the gauge wheel 104 during rotation of the gauge wheel 104.

In the illustrative embodiment, as shown in FIGS. 1-4, the teeth 120 are arranged at an outer periphery of the gauge wheel 104. The teeth 120 extend radially outwardly in a direction away from a center of the gauge wheel 104. Each tooth 120 is sloped in a circumferential direction, such that each tooth 120 includes a first end 122 and a second end 124 that is located a distance counterclockwise from the first end 122, and the second end 124 of each tooth 120 is located radially inward of the first end 122 of each tooth 120. In this arrangement, as shown in FIG. 3, each tooth 120 slopes downwardly in the counterclockwise direction and upwardly in the clockwise direction.

Referring still to FIG. 3, each tooth 120 is also sloped in the lateral direction (see arrows 144, 146), such that each tooth 120 includes an exterior side 128 and an interior side 126 that is located a distance laterally inward from the exterior side 128, and the interior side 126 of each tooth 120 is located radially outward of the exterior side 128 of each tooth 120. In this arrangement, each tooth 120 slopes upwardly in the laterally inward direction (arrow 144) and downwardly in the laterally outward direction (arrow 146).

Referring still to FIG. 3, the slope of each tooth 120 is defined by one or more radially outwardly facing surfaces, for example surfaces 134, 135, 136. At least one radially outwardly facing surface, e.g., 136, may be concave; at least one radially outwardly facing surface, e.g., 134, may be convex and/or concave at various portions thereof; and at least one radially outwardly facing surface, e.g., 135, may be neither concave nor convex as suggested by FIGS. 3, 5 and 6. As shown in FIGS. 3 and 4, the scraper 118 further includes a laterally inwardly facing surface 130. In illustrative embodiment, the laterally inwardly facing surface 130 is substantially flat or planar and configured to contact and rotate against the opener disc 106 during forward travel of the row unit 100. In some embodiments, the laterally inwardly facing surface 130 of the scraper 118 is parallel to the external surface of the opener disc 106. The one or more radially outwardly facing surfaces 134, 136 of the scraper 118 intersect the laterally inwardly facing surface 130 at edges 138 of the teeth 120.

It should be appreciated that in some embodiments, the scraper 118 and the gauge wheel 104 are defined as separate components coupled to one another, yet in other embodiments, the scraper 118 and the gauge wheel 104 are a single monolithic component.

The scraper 118 may be described as including a hoop 150 and a lip 152 defined on a radially inward side of the hoop 150. Each of the hoop 150 and the lip 152 extend circumferentially to define a ring-shaped body of the scraper 118. The hoop 150 includes the one or more radially outwardly facing surfaces, e.g., 134, 135, 136, which define the teeth 120. The hoop 150 also includes a radially inwardly facing surface 154 (see FIGS. 5 and 6) opposite the one or more radially outwardly facing surfaces 134, 136. The lip 152 includes the laterally inwardly facing surface 130 of the scraper 118 described above (i.e. the surface that contacts the opener disc 106). The laterally inwardly facing surface 130 may be described as a first surface 130, especially when the scraper 118 is detached from the gauge wheel 104.

Figure 5:
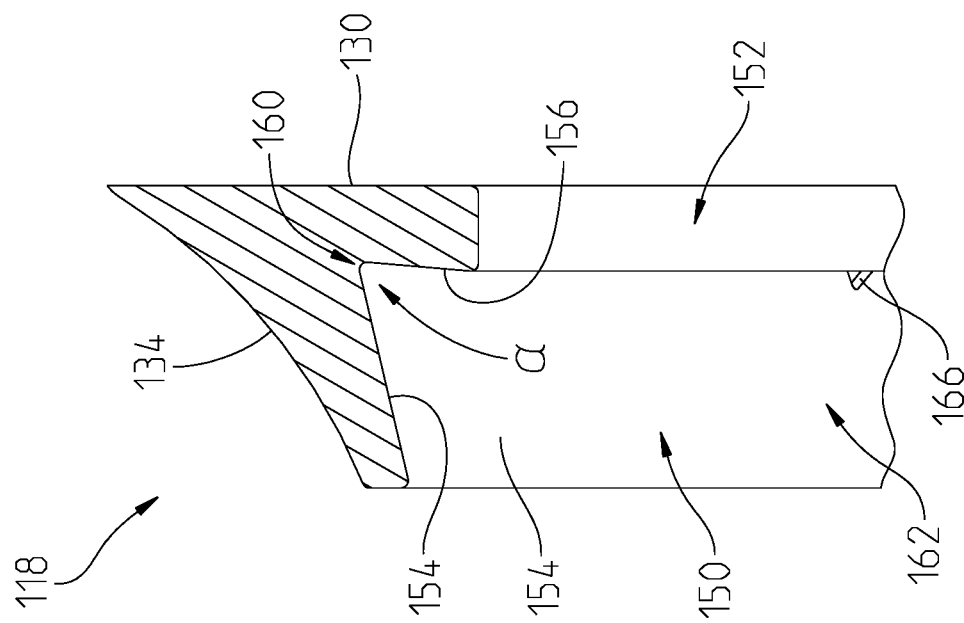
FIG. 5 is a cross section view of the scraper cut along the line 5-5 of FIG. 3.

Turning now to FIG. 5, a cross-section view of the scraper 118 is shown. As shown in FIG. 5, the lip 152 also includes a second surface 156 opposite the first surface 130 of the lip 152. In the illustrative embodiment, the second surface 156 of the lip 152 is positioned at an acute angle relative to the radially inwardly facing surface 154 of the hoop 150. The acute angle is referred to as the angle α in FIG. 5. The radially inwardly facing surface 154 of the hoop 150 and second surface 156 of the lip 152 may be referred to as a gauge-wheel-contacting portion 160 of the scraper 118. As shown in FIG. 5, the gauge-wheel-contacting portion 160 of the scraper 118 defines a cavity 162 in the ring-shaped body of the scraper 118.

Figure 6:
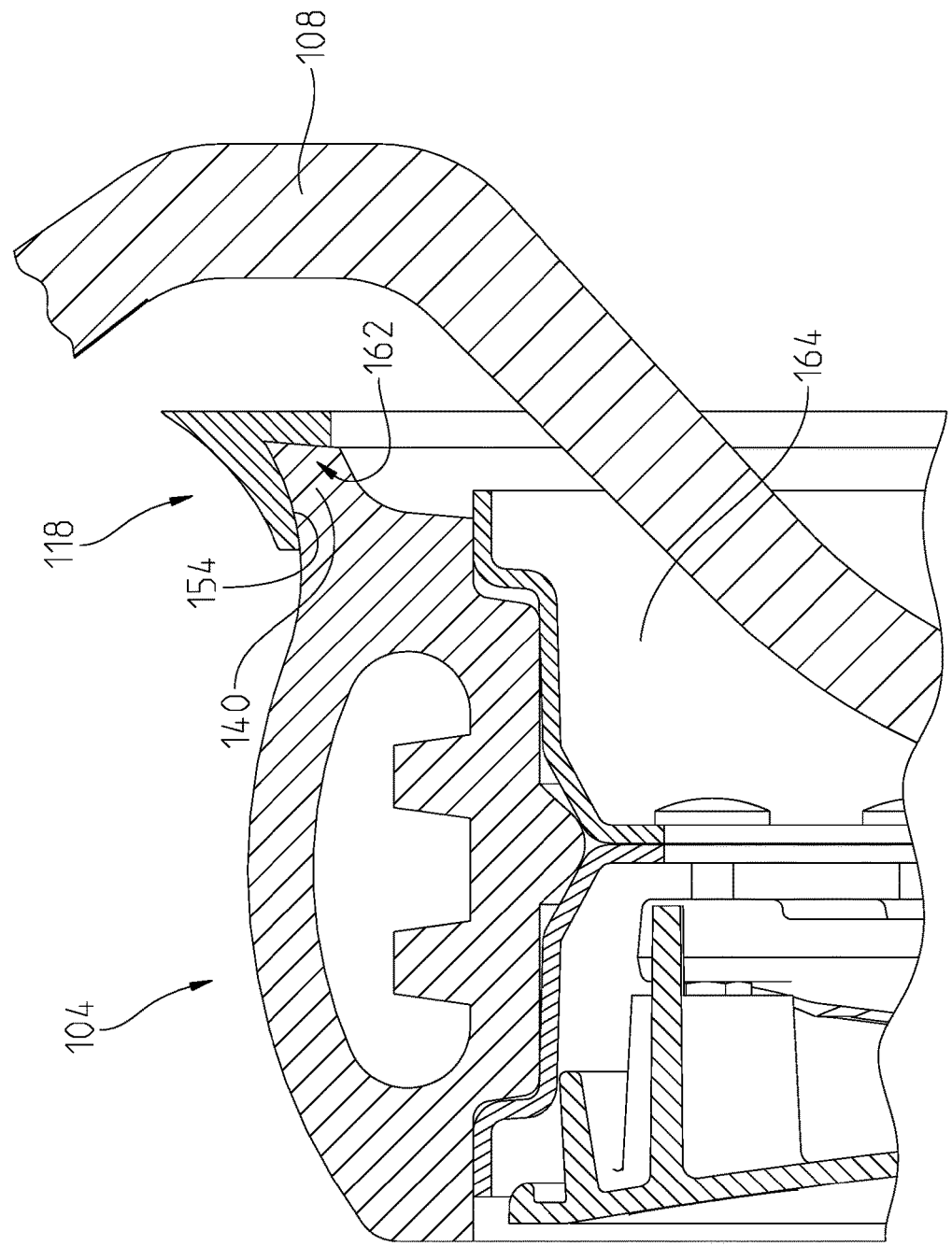
FIG. 6 is a cross section view cut along the line 6-6 of FIG. 2, which shows the press fit connection between the gauge wheel and the scraper.

As suggested by FIG. 6, in the illustrative embodiment, the scraper 118 is coupled directly to the gauge wheel 104 via a press-fit connection. For example, the gauge wheel 104 includes a compressible portion 140 that is compressed against the radially inwardly facing surface 154 of the scraper 118. In other words, the compressible portion 140 is positioned in the cavity 162 of the scraper 118 to form the press-fit connection. The gauge wheel 104 further comprises a rim 164 positioned radially inward of the compressible portion 140 thereof, and the compressible portion 140 of the gauge wheel 140 is compressed between the rim 164 and the scraper 118. The compressible portion 140 of the gauge wheel 104 applies a radially outwardly directed force to the radially inwardly facing surface 154 of the scraper 118 urging the scraper 118 to expand radially outwardly, which, as resisted by the scraper 118, forms the press-fit connection between the scraper 118 and the gauge wheel 104.

Referring again to FIG. 5, the scraper 118 may include one or more tabs 166 defined in the cavity 162. The one or more tabs 166 abut the gauge wheel 104 to prevent rotation of the scraper 118 relative to the gauge wheel 104 during rotation of the row unit 100. This is especially advantageous since the teeth 120 of the scraper 118 engage with the soil during rotation of the gauge wheel 104.

In use, the scraper 118 may be assembled with the gauge wheel 104 as follows. First a conventional scraper may be removed from the row unit 100. The conventional scraper may be coupled to the frame 102 of the row unit directly 100 and may extend into a radially inner portion of the gauge wheel 104. Other conventional scrapers may be arranged in different orientations. In any event, the conventional scraper is often configured to remove soil or debris from the external side of the opening disc 106 of the row unit 100. Second, the ring-shaped scraper 118 may be coupled to the gauge wheel 104 via the press-fit connection described here. In some embodiments, the scraper 118 may be coupled to the gauge wheel 104 in other arrangements. In any event, when the scraper 118 is coupled to the gauge wheel 104, an internally facing side of the ring-shaped scraper (e.g., laterally inwardly facing surface 130 of the scraper 118) contacts an external side of an opening disc 106 of the row unit 100. During operation of the agricultural machine, the row unit 100 moves in the forward direction 132, which causes rotation of the gauge wheel 104 and thereby rotation of the scraper 118 coupled to the gauge wheel 104. As the scraper 118 rotates, the teeth 120 of the scraper 118 contact the opener disc 106 removing dirt and debris therefrom and depositing the dirt and debris away from the radially inner portion of the gauge wheel 104.

Referring again to FIG. 2, the arm 108 is configured to couple to gauge wheel 104 (and the scraper 118) to the frame 102 as described above. Specifically, the hub 112 of the gauge wheel 104 is coupled to the first end 110 of the arm 108, and the gauge wheel 104 rotates about the first end 110 of the arm 108. The second end 114 of the arm includes an adjustment mechanism 116 configured to adjust the lateral distance between the scraper 118 and the opener disc 106.

Figure 7:
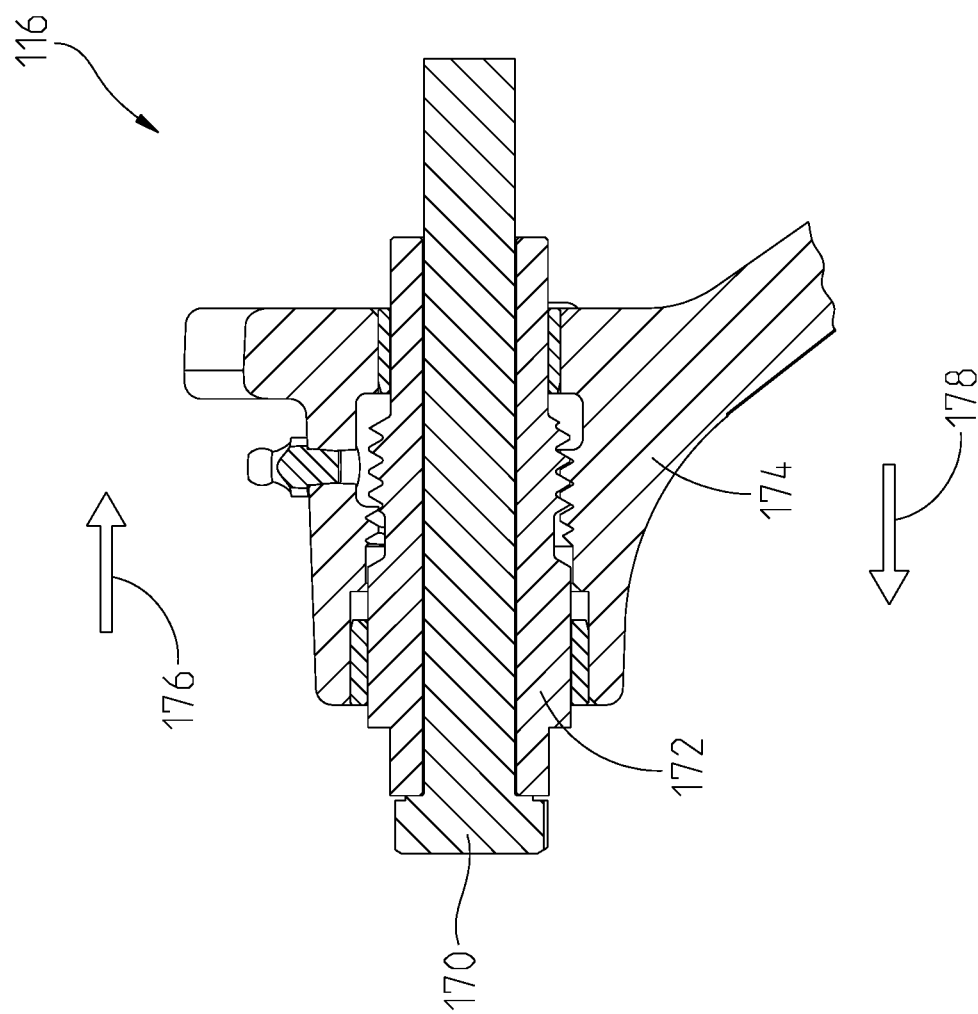
FIG. 7 is a cross section view cut along the line 7-7 of FIG. 2, which shows a threaded sleeve and a locking bolt of the adjustment mechanism.

As shown in FIG. 7, the adjustment mechanism 116 includes a torque bolt 170, a threaded sleeve 172, and a housing 174. The torque bolt 172 is positioned within the threaded sleeve 172, and the threaded sleeve 172 is positioned within and threadingly coupled to the housing 174. In use, the torque bolt 170 is loosened, and thereafter, the threaded sleeve 174 may be moved laterally inward (in the direction of arrow 176) or laterally outward (in the direction of arrow 178) relative to the housing 174. Lateral movement of the threaded sleeve 172 relative to the housing 174 adjusts the lateral position of the scraper 118 relative to the opener disc 106. Accordingly, the scraper 118 may be adjusted so that a space exists between the scraper 118 and the opener disc 106, which may be advantageous in certain soil conditions or in certain planting or fertilizing applications.

Figure 8:
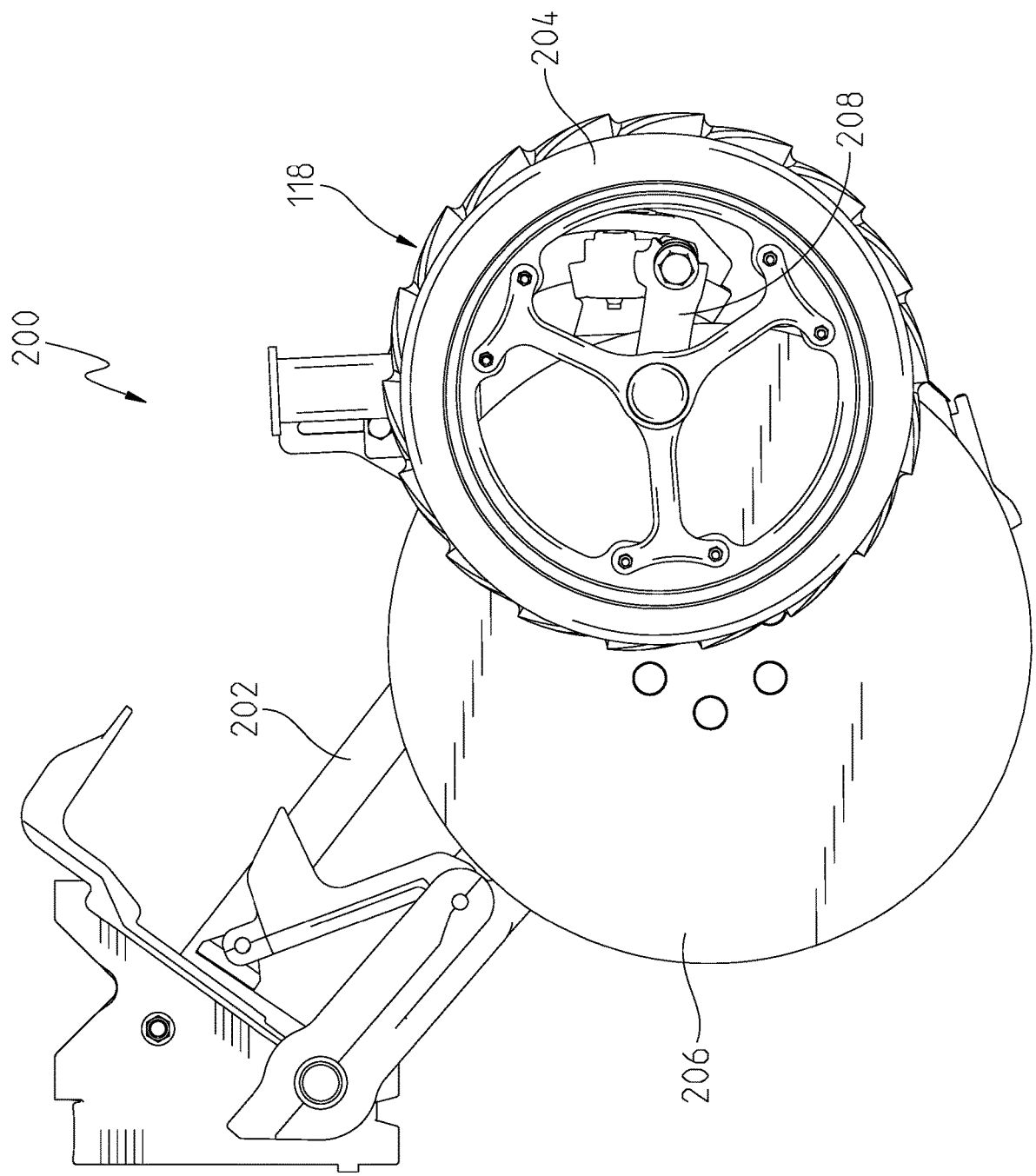
FIG. 8 is a side view of a fertilizer unit of an agricultural machine.

As shown in FIG. 8, the scraper 118 is suitable for use with a fertilizer unit 200 that includes an opener disc 206 and a gauge wheel 204. It should be appreciated that the gauge wheel 204 (or gauge wheel 104) could be replaced with another rotating component positioned adjacent to the opener disc 206 (or the opener disc 106), in which the case, the scraper 118 would be attached to the another rotating component and still configured to abut and rotate against the opener disc 206 (or opener disc 106) as described above. Referring still to FIG. 8, in the illustrative embodiment, the fertilizer unit 200 includes a frame 202, the opener disc 206 coupled to the frame 202, and the gauge wheel 204, which is positioned adjacent the opener disc 206. The gauge wheel 204 is coupled indirectly to the frame 102 via an arm 208. The ring-shaped scraper 118 is coupled to a periphery of the gauge wheel 204 and configured to rotate therewith, contacting the opener disc 206, to remove dirt and debris from the opener disc 206. The fertilizer unit 200 with the scraper 118 is an example of a single disc opener embodiment, while the row unit 100 with the scraper 118 is an example of a dual disc opener embodiment. It should be appreciated that, unless otherwise stated, the arrangement and components of the scraper 118 for the single disc opener embodiment are the same as those described for the dual disc opener embodiment.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A scraper system for an agricultural machine comprising:
    an opener disc coupled to a frame;
    a gauge wheel positioned adjacent the opener disc and configured to rotate relative to the frame;
    a scraper configured to rotate with the gauge wheel to remove soil or debris from the opener disc;
    wherein the scraper includes a laterally inwardly facing surface configured to contact the opener disc during forward travel of the agricultural machine;
    wherein the scraper includes a plurality of teeth and each tooth of the plurality of teeth includes two or more radially outwardly facing surfaces facing radially outwardly away from a center of the gauge wheel;
    wherein at least one radially outwardly facing surface of the two or more radially outwardly facing surfaces is concave and another at least one radially outwardly facing surface of the two or more radially outwardly facing surfaces is a convex;
    wherein the at least one radially outwardly facing surface that is concave extends away from the laterally inwardly facing surface.

2. The scraper system of claim 1, wherein the scraper is ring-shaped.

3. The scraper system of claim 1, wherein each of the plurality of teeth includes two or more radially outwardly facing surfaces; and
    wherein the two or more radially outwardly facing surfaces intersect the laterally inwardly facing surface of the scraper to define the plurality of teeth of the scraper.

4. The scraper system of claim 1, wherein the gauge wheel and the scraper are separate components coupled together.

5. The scraper system of claim 4, wherein the scraper is coupled directly to the gauge wheel.

6. The scraper system of claim 4, wherein the scraper includes a gauge-wheel-contacting portion comprising one or more surfaces configured to abut the gauge wheel;
    wherein the scraper further includes one or more tabs positioned on the one or more surfaces configured to abut the gauge wheel; and
    wherein the one or more tabs prevent rotation of the scraper relative to the gauge wheel during operation of the agricultural machine.

7. The scraper system of claim 4, wherein the gauge wheel includes a compressible portion that is compressed against a radially inwardly facing surface included in a gauge-wheel-contacting portion of the scraper.

8. The scraper system of claim 7, wherein gauge wheel further comprises a rim positioned radially inward of the compressible portion; and
    wherein the compressible portion of the gauge wheel is compressed between the rim and the scraper.

9. The scraper system of claim 1, wherein the gauge wheel and the scraper are a single monolithic component.

10. A scraper system for an agricultural machine comprising:
    an opener disc coupled to the frame;
    a gauge wheel positioned adjacent the opener disc and configured to rotate relative to the frame;
    a scraper configured to rotate with the gauge wheel to remove soil or debris from the opener disc;
    wherein the scraper includes a plurality of teeth and each tooth of the plurality of teeth includes a plurality of radially outwardly facing surfaces facing radially outwardly away from a center of the gauge wheel;
    wherein the gauge wheel and the scraper are configured to rotate in a counterclockwise direction as the agricultural machine moves in a forward direction;
    wherein each tooth of the plurality of teeth is arranged to contact the opener disc during travel of the agricultural machine in the forward direction; and
    wherein each radially outwardly facing surface of the plurality of radially outwardly facing surfaces of each tooth slopes from a first end to a second end in the counterclockwise direction, wherein the first end is radially outward of the second end.

11. The scraper system of claim 10, wherein the scraper is ring-shaped.

12. The scraper system of claim 10, wherein the scraper includes a laterally inwardly facing surface; and
    wherein two or more radially outwardly facing surfaces of the plurality of radially outwardly facing surfaces of each tooth intersect the laterally inwardly facing surface of the scraper to define the plurality of teeth of the scraper.

13. The scraper system of claim 10, wherein the gauge wheel and the scraper are separate components coupled together.

14. The scraper system of claim 10, wherein the scraper is coupled directly to the gauge wheel.

15. The scraper system of claim 10, wherein the scraper includes a gauge-wheel-contacting portion comprising one or more surfaces configured to abut the gauge wheel;
    wherein the scraper further includes one or more tabs positioned on the one or more surfaces configured to abut the gauge wheel; and
    wherein the one or more tabs prevent rotation of the scraper relative to the gauge wheel during operation of the agricultural machine.

16. The scraper system of claim 10, wherein the gauge wheel includes a compressible portion that is compressed against a radially inwardly facing surface of the scraper.

17. The scraper system of claim 15, wherein gauge wheel further comprises a rim positioned radially inward of the compressible portion; and
    wherein the compressible portion of the gauge wheel is compressed between the rim and the scraper.

18. The scraper system of claim 10, wherein the gauge wheel and the scraper are a single monolithic component.

19. The scraper system of claim 10, wherein at least one radially outwardly facing surface of the two or more radially outwardly facing surfaces is concave and another at least one radially outwardly facing surface of the two or more radially outwardly facing surfaces is a convex.

* * * * *